(12) United States Patent
Bal et al.

(10) Patent No.: US 12,436,853 B2
(45) Date of Patent: Oct. 7, 2025

(54) METHOD AND ARCHITECTURE FOR SERIAL LINK CHARACTERIZATION BY ARBITRARY SIZE PATTERN GENERATOR

(71) Applicant: STMicroelectronics International N.V., Geneva (CH)

(72) Inventors: Ankur Bal, Greater Noida (IN); Rupesh Singh, Ghaziabad (IN)

(73) Assignee: STMicroelectronics International N.V., Geneva (CH)

( * ) Notice: Subject to any disclaimer, the term of this patent is extended or adjusted under 35 U.S.C. 154(b) by 810 days.

(21) Appl. No.: 17/682,167

(22) Filed: Feb. 28, 2022

(65) Prior Publication Data

US 2022/0188203 A1 Jun. 16, 2022

Related U.S. Application Data

(63) Continuation-in-part of application No. 17/393,492, filed on Aug. 4, 2021.
(Continued)

(51) Int. Cl.
| | |
|---|---|
| *G06F 11/22* | (2006.01) |
| *G06F 7/58* | (2006.01) |
| *H04B 17/00* | (2015.01) |
| *H04L 1/24* | (2006.01) |
| *G06F 13/42* | (2006.01) |

(52) U.S. Cl.
CPC ............ *G06F 11/221* (2013.01); *G06F 7/582* (2013.01); *H04B 17/0085* (2013.01); *H04L 1/242* (2013.01); *G06F 13/4282* (2013.01)

(58) Field of Classification Search
CPC .. H04B 10/07; H04B 10/077; H04B 10/0775; H04B 10/0795; H04B 17/00; H04B 17/0085; H04L 1/24; H04L 1/242; H04L 1/244; G06F 11/221; G06F 11/263;
(Continued)

(56) References Cited

U.S. PATENT DOCUMENTS

| | | | |
|---|---|---|---|
| 5,974,433 A | 10/1999 | Currie | |
| 5,991,909 A | 11/1999 | Rajski et al. | |

(Continued)

OTHER PUBLICATIONS

CN Notice of Allowance for counterpart CN Appl. No. 202111005174.3, report dated May 19, 2025, 4 pgs.

*Primary Examiner* — Matthew D Sandifer
(74) *Attorney, Agent, or Firm* — Crowe & Dunlevy LLC

(57) ABSTRACT

A serial-connection is tested by transmitting a PRBS generated using a kth-order monic-polynomial from transmission-circuitry to reception-circuitry, and determining operation is proper based upon the PRBS received. The PRBS is formed by generating x intermediate-words of the PRBS, x being a result of an integer-divide between a total number of bits in the PRBS and a bit-width of a serializer that transmits the PRBS, generating a leading-word of the PRBS as having first y-bits of the PRBS as its LSBs, y being based upon a modulo-divide between the total number of bits in the PRBS and x, and generating a trailing-word of the PRBS as having last z-bits of the PRBS as its MSBs, z being based upon a difference between a result of the modulo-divide and y. The PRBS is transmitted sequentially as the leading-word of the PRBS, the intermediate-words of the PRBS, and the trailing-word of the PRBS.

16 Claims, 8 Drawing Sheets

Related U.S. Application Data

(60) Provisional application No. 63/072,376, filed on Aug. 31, 2020.

(58) Field of Classification Search
CPC ......... G06F 13/4282; G06F 2213/0002; G06F 7/58–586
See application file for complete search history.

(56) References Cited

U.S. PATENT DOCUMENTS

| | | | |
|---|---|---|---|
| 7,613,757 B1 | 11/2009 | Abbaszadeh et al. | |
| 2006/0133468 A1* | 6/2006 | Chen ................... | H04B 17/0085 |
| | | | 375/340 |
| 2011/0187400 A1* | 8/2011 | Watanabe ........ | G01R 31/31932 |
| | | | 324/537 |
| 2011/0299569 A1* | 12/2011 | Baba ................ | G01R 31/31707 |
| | | | 375/E1.001 |
| 2011/0299581 A1* | 12/2011 | Le-Gall .......... | G01R 31/318385 |
| | | | 375/224 |
| 2011/0302471 A1* | 12/2011 | Le-Gall .......... | G01R 31/318385 |
| | | | 714/E11.169 |
| 2015/0268933 A1 | 9/2015 | Rivoir | |
| 2018/0246701 A1 | 8/2018 | Kawai et al. | |
| 2018/0337707 A1* | 11/2018 | Hirschmann ........... | G06F 7/586 |

\* cited by examiner

METHOD AND ARCHITECTURE FOR SERIAL LINK CHARACTERIZATION BY ARBITRARY SIZE PATTERN GENERATOR

RELATED APPLICATION

This is a continuation-in-part of U.S. patent application Ser. No. 17/393,492, filed Aug. 4, 2021 which claims priority to U.S. Provisional Application Patent No. 63/072,376, filed Aug. 31, 2020, the contents of both of which are incorporated by reference in their entirety to the maximum extent allowable under the law.

TECHNICAL FIELD

This disclosure is related to the field of linear feedback shift registers (LFSRs) and, in particular, is related to a parallelized design for a LFSR capable of high throughput. This disclosure is also related to a pattern generator that can adapt a pseudo-random number of arbitrary size for use in serial transmission hardware having an arbitrary number of inputs.

BACKGROUND

A liner feedback shift register (LFSR) is a shift register whose input bit is a linear function of its previous state. This input bit is typically generated as an exclusive OR of bits from certain taps of the LFSR. The operation of a LFSR is deterministic, since the stream of values produced thereby is determined by its current or previous states. Since the LFSR has a finite number of possible states, it eventually enters a repeating cycle. However, since LFSRs include a feedback function, they may produce a sequence of bits that appears random, and has a very long repeating cycle. Therefore, LFSRs are widely used in applications to generate pseudo-random numbers.

A typical LFSR 10 is shown in FIG. 1, and is formed as a chain of flip flops synchronously clocked by a clock signal CLK. Here, the LFSR 10 is an N-bit LFSR, so there are N flip flops, labeled as being from D[0] to D[N-1]. The flip flop D[0] receives input from an exclusive OR tree 11, and provides output to the subsequent flip flop D[1] in the chain, which in turn provides output to the next flip flop in the chain, and so on until the last flip flop D[N-1] in the chain receives input from the previous flip flop D[N-2].

A primitive polynomial function (the generation of which is known to those of skill in the art) of order N-1 (this N being the same N as the number of bits of the LFSR) is used to determine the inputs to the XOR tree 11. In particular, the outputs of the flip flops corresponding to the exponents of the primitive polynomial function become the inputs to the XOR tree 11. In the illustrated example, the exponents of the primitive polynomial function of order N are i, j, and N-1. Therefore, as illustrated, the inputs to the XOR tree 11 are the outputs of the flip flops D[i], D[j], and D[N-1].

LFSRs 10 such as the design illustrated in FIG. 1 are quite useful and are in wide usage. However, such LFSRs 10 encounter issues when it is desired to operate them at high speed (i.e., with a clock CLK having a high frequency) despite the fact they are formed in slower technologies. In particular, the individual flip flops are limited by setup time, limiting the speed at which such LFSRs 10 can operate when implemented in certain technologies.

Therefore, a need remains for LFSRs 10 that can operate at high speed, even when implemented in slower technologies.

The pseudo-random numbers generated by LFSRs may be used to test various characteristics of high-speed serial links, for example transition time, Jitter performance, etc., by transmission of a known pseudo-random sequence generated by a LFSR to a receiver. This transmission may be accomplished by generating the pseudo-random numbers at a LFSR as a 1-bit wide bitstream, parallelizing the pseudo-random numbers, and then serializing the parallelized pseudo-random numbers for transmission over the high-speed serial link.

A challenge arises in high speed serial link where there is a mismatch between number of bits in the pseudo-random numbers and the number of input bits to the serializing circuitry, which commonly occurs due to the nature of pseudo-random number generation. When there is no common factor between the number of bits in the pseudo-random numbers and the number of input bits to the serializing circuitry, the use of a dedicated first-in-first-out (FIFO) buffer or elastic buffer between the pseudo-random number generator and the serializer is required in order to permit proper operation. This is undesirable because the buffer consumes a large amount of area, placing practical constraints on the length of the pseud-random numbers utilized.

Therefore, a need remains for a pattern generator (which may utilize a LFSR as a sub-component) that can adapt a pseudo-random number of any length to a serializer having any number of inputs.

SUMMARY

Disclosed herein is a method of testing a serial data connection. The method includes transmitting a pseudo-random binary sequence (PRBS) generated using a kth order monic polynomial from transmission side circuitry to reception side circuitry over a physical link, determining whether the PRBS received at the reception circuitry is as expected and/or whether electrical parameters of the physical link are acceptable, and indicating an error if the PRBS received at the reception circuitry is not as expected or if the electrical parameters of the physical link are not acceptable. The PRBS is generated by: generating x intermediate words of the PRBS, with x being a result of an integer divide between a total number of bits in the PRBS and a bit-width of a serializer that transmits the PRBS over the serial data connection; generating a leading word of the PRBS, the leading word having first y bits of the PRBS as its least significant bits, with y being based upon a modulo divide between the total number of bits in the PRBS and x; and generating a trailing word of the PRBS, the trailing word having last z bits of the PRBS as its most significant bits, with z being based upon a difference between a result of the modulo divide and y. The PRBS is transmitted by performing steps of transmitting the leading word of the PRBS, transmitting the intermediate words of the PRBS, and transmitting the trailing word of the PRBS.

The leading word of the PRBS may be generated as having its most significant bits as being zeroes, and the trailing word of the PRBS may be generated as having its least significant bits as being zeroes.

The intermediate words of the PRBS may be generated using a hardware PRBS predictor that predicts the intermediate words based upon a seed and outputs each intermediate word in a parallel fashion.

The leading word of the PRBS may be generated by reading from a memory element separate from the hardware PRBS predictor. Transmitting the leading word of the PRBS includes selecting the leading word for serialization and transmission, and transmitting the intermediate words of the PRBS includes selecting the intermediate words of the PRBS for serialization and transmission. The trailing word of the PRBS may be generated by reading from the memory element, and transmitting the trailing word of the PRBS includes selecting the trailing word for serialization and transmission.

The kth order monic polynomial may be a $23^{rd}$ order monic polynomial, and the bit-width of the serializer may be 16 bits.

The kth order monic polynomial may be a monic polynomial that is odd in order, and the bit-width of the serializer may be even.

Also disclosed herein is transmission-side circuitry for use in a serial communications system. The transmission-side circuitry includes a pattern generator configured to generate a pseudo-random binary sequence (PRBS) according to a kth order monic polynomial, the PRBS being generated as a series of words of a given bit size, and a serializer having a number of inputs equal in number to the given bit size, coupled to serially receive the series of words of the PRBS from the pattern generator, and producing a PRBS output. A line driver is configured to transmit the PRBS output in a serial fashion over a physical link.

The pattern generator includes: a PRBS predictor configured to generate x intermediate words of the PRBS based upon a received k-bit seed and output the intermediate words in a parallel fashion, with x being a result of an integer divide between a total number of bits in the PRBS and the given bit size; a memory element configured to: store a leading word of the PRBS, the leading word having first y bits of the PRBS as its least significant bits, with y being based upon a modulo divide between the total number of bits in the PRBS and x; and store a trailing word of the PRBS, the trailing word having last z bits of the PRBS as its most significant bits, with z being based upon a difference between a result of the modulo divide and y; a multiplexer having: a first input set coupled to the PRBS predictor to receive the intermediate words in a parallel fashion, and a second input set coupled to the memory element to receive either the leading word or the trailing word in a parallel fashion; and a control circuit configured to receive the intermediate words of the PRBS and based thereupon, control the multiplexer to sequentially output the leading word of the PRBS, output the intermediate words of the PRBS, and output the trailing word of the PRBS.

The kth order monic polynomial is a monic polynomial that is odd in order, and the serializer has an even number of inputs.

The kth order monic polynomial may be a $23^{rd}$ order monic polynomial, and given bit size may be 16 bits.

The PRBS predictor may include: 23 flip flops clocked by a same clock signal and providing outputs in parallel to the multiplexer; and 16 multiplexers having outputs respectively coupled to inputs of 16 of the 23 flip flops, having first inputs respectively receiving the k-bits of the k-bit seed, and having second inputs respectively receiving outputs of 16 exclusive-OR gates; wherein each of the 16 exclusive-OR gates has inputs coupled to different ones of the outputs of the 23 flip flops.

The leading word of the PRBS may have its most significant bits as being zeroes. The trailing word of the PRBS may have its least significant bits as being zeroes.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 2:
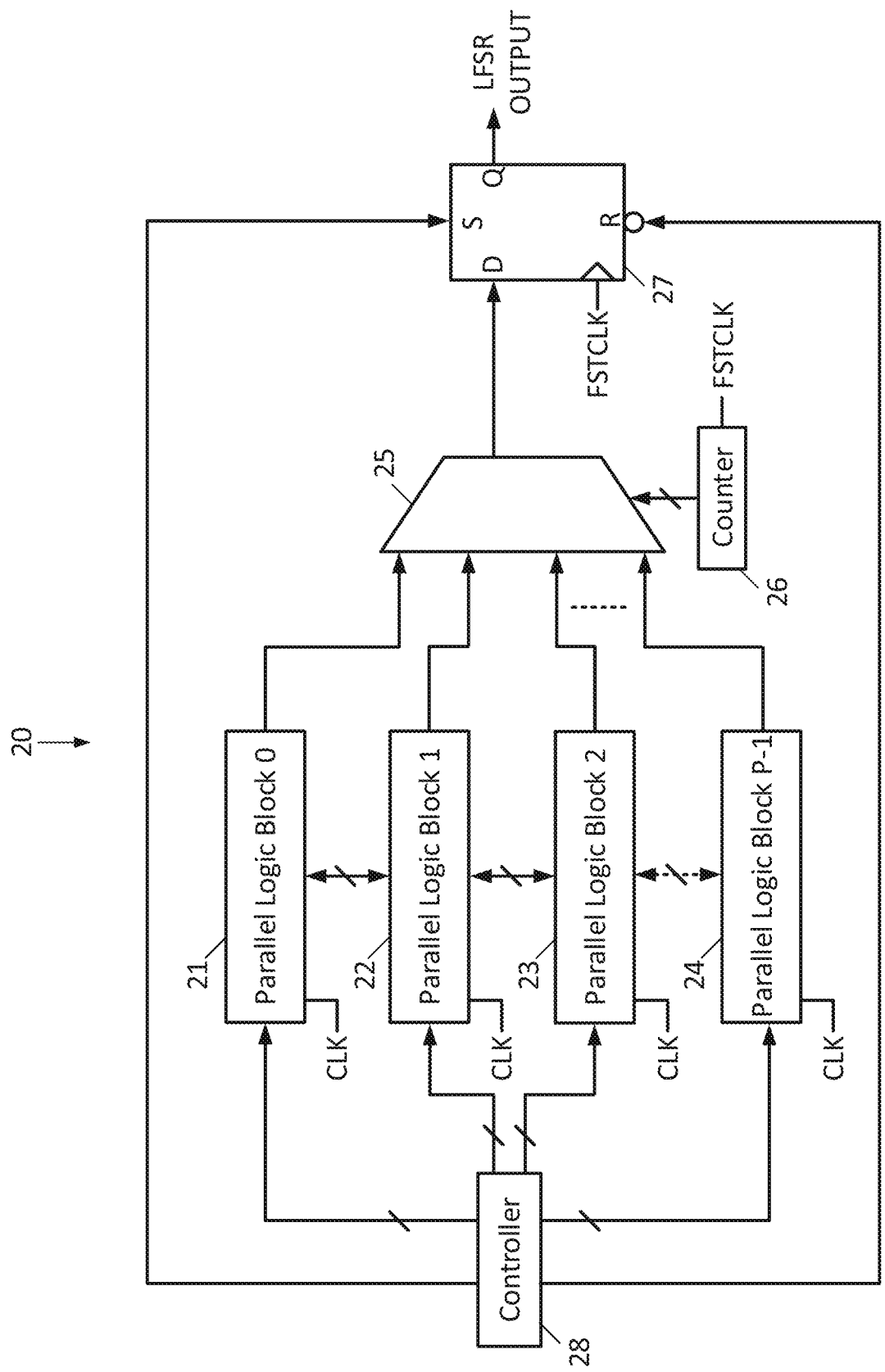
FIG. 2 is a block diagram of a LFSR described herein.

Referring initially to FIG. 2, a linear feedback shift register (LFSR) 20 is disclosed herein. The LFSR 20 is an N-bit LFSR comprised of parallel logic blocks 21-24 that, through a multiplexer 25, provide output to an output flip flop 27. The output flip flop 27 is clocked by a fast or high speed clock FSTCLK, and the parallel logic blocks 21-24 are each comprised of flip flop chains clocked by a slow clock CLK, the slow clock being equal to the fast clock FSTCLK divided by a divisor P. The specific frequencies of FSTCLK and CLK are dependent upon the technology used in the LFSR design.

With the numbers N and P now being understood, in greater detail, the LFSR 20 includes P parallel logic blocks (illustrated as parallel logic blocks 21-24, referred to as Parallel Logic Blocks 0 to P-1, with it being understood that there may be any number P of parallel logic blocks), having interconnections with each other, and each providing output to the multiplexer 25. As explained, each parallel logic block 21-24 is comprised of a chain of flip flops clocked by the slow clock CLK. The multiplexer 25 has a selection input that receives input from a counter 26 clocked by the high speed clock FSTCLK. The counter 26 counts from 0 to P-1, provides its output at each increment to the selection input of the multiplexer 25, and overflows (thereby effectively resetting) once its count reaches P-1. The output of the multiplexer 25 is fed to the input of a flip flop 27, which as stated above is clocked by the high speed clock FSTCLK to provide as output a LFSR output stream of bits. Note that a controller 28 generates set and reset signals for the flip flop 27, as well as all flip flops within the parallel logic blocks 21-24.

Figure 3:
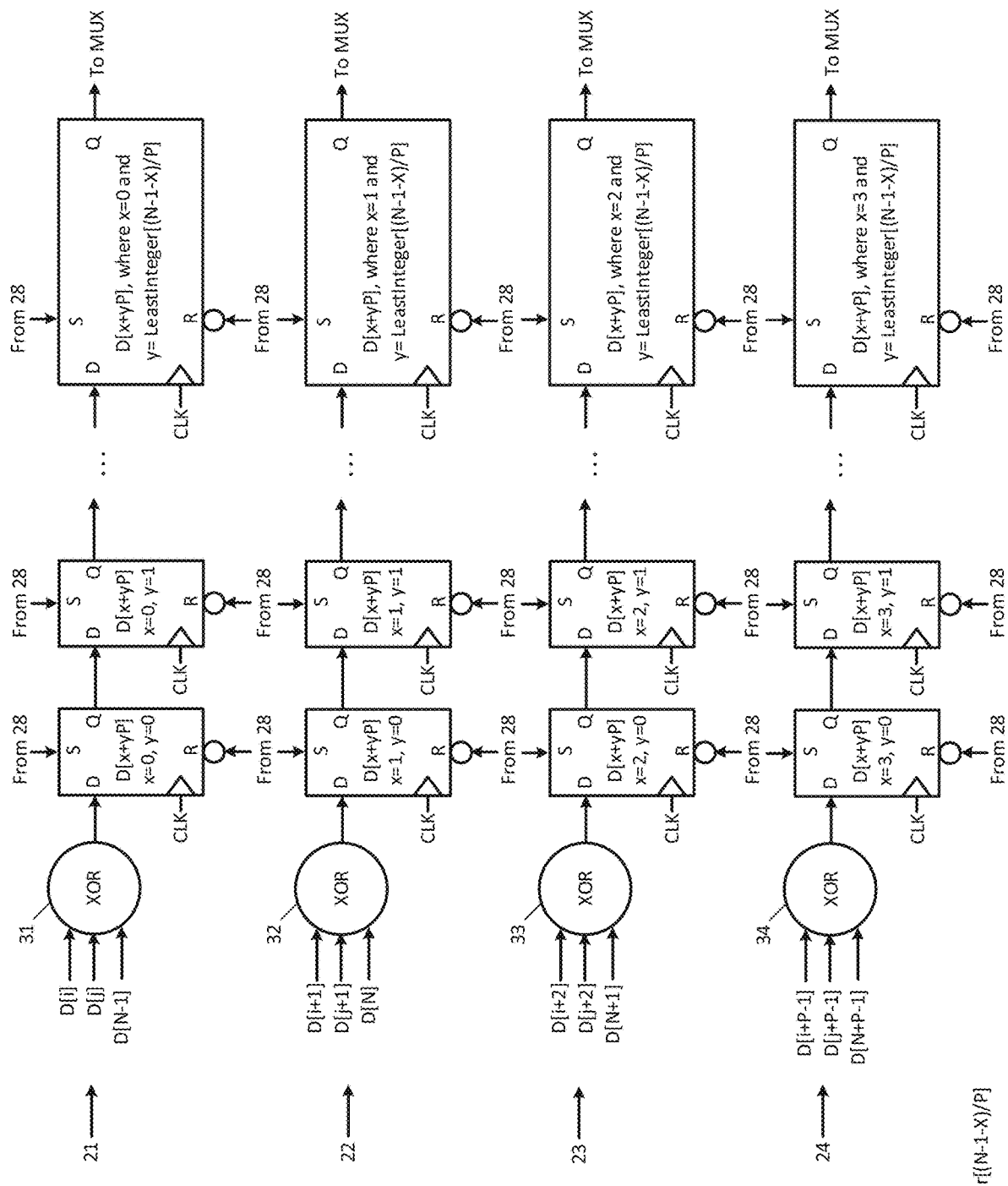
FIG. 3 is a generalized schematic block diagram illustrating the parallel logic blocks of FIG. 2.

The structure of the parallel logic blocks 21-24 is now described with additional reference to FIG. 3. Each of the parallel logic blocks 21-24 includes a plurality of flip flops connected in a chain and indexed according to the expression D[x+yP], where x represents which parallel logic block an individual flip flop belongs to (so, x=0 indicates that a flip flop belongs to the parallel logic block 21; x=1 indicates that the flip flop belongs to the parallel logic block 22, and so on and so forth), where y indicates the position of an individual flip flop within its respective parallel logic block (so, y=0 indicates that a flip flop is the first in its parallel logic block; y=1 indicates that a flip flop is the second in its parallel logic block, and so on and so forth), and where P indicates the divisor applied to the high speed clock FSTCLK.

Note, however, that the last flip flop of each parallel logic block has a y value equal to the smallest integer greater than or equal to (N−1−x)/P, keeping in mind that N represents the number of bits of the LFSR 20. Mathematically, this is known as a least integer function, so y for the last flip flop in each parallel logic block can be mathematically represented as:

$$y = LeastInteger\left[\frac{N-1-x}{P}\right] \quad (1)$$

Mathematically, this equation can be derived from the fact that the y value of the last flip flop in each parallel logic block is to be greater than or equal to N−1. Thus, we can derive the above equation as follows:

$$x + yP \geq N-1 \quad (2)$$

Rearranging this equation yields:

$$y \geq \frac{N-1-x}{P} \quad (3)$$

Since y is to be an integer, the least integer function is used, yielding the equation (1) described above.

The input to each first flip flop of each parallel logic block 21-24 is the output of a respective exclusive OR circuit 31-34. The inputs to each exclusive OR circuit 31-34 are as now described.

The inputs to the exclusive OR circuit 31 of the parallel logic block 21 are the exponents of a primitive polynomial of order N−1. Primitive polynomials are known to those of ordinary skill in the art, and therefore need not be described in detail here, as one of ordinary skill in the art can calculate a primitive polynomial of any order. To keep this example generic, assume that the exponents to the primitive polynomial of order N−1 are i, j, and N−1. Therefore, the inputs to the exclusive OR circuit 31 are the outputs of the flip flops D[N−1], D[i], and D[j], keeping in mind that the index (the number within the brackets after D) is calculated as described above. Therefore, whichever flip flops have indexes calculated to equal N−1, i, and j provide output to the input of the exclusive OR circuit 31. These flip flops with the noted indexes can exist in any of the parallel logic blocks 21-24.

For each successive parallel logic block, the indexes calculated for the immediately preceding parallel logic block are incremented by one. Therefore, since the indexes calculated for the inputs to the exclusive OR circuit 31 are N−1, i, and j, the indexes for inputs to the exclusive OR circuit 32 are N, i+1, and j+1. Therefore, the outputs of the flip flops D[N], D[i+1], and D[j+1] are the inputs to the exclusive OR circuit 32.

Continuing with this, since the indexes calculated for inputs to the exclusive OR circuit 32 are N, i+1, and j+1, the indexes for the inputs to the exclusive OR circuit 33 are N+1, i+2, and j+2. Therefore, the outputs of the flip flops D[N+1], D[i+2], and D[j+2] are the inputs to the exclusive OR circuit 33.

Similarly, since the indexes calculated for inputs to the exclusive OR circuit 33 are N+1, i+2, and j+2, the indexes for the inputs to the exclusive OR circuit 34 are N+P−1 (since the last parallel logic block is the P−1th logic parallel logic block), i+P−1, and j+P−1. Therefore, the outputs of the flip flops D[N+P−1], D[i+P−1], and D[j+P−1] are the inputs to the exclusive OR circuit 34.

Those of ordinary skill in the art will understand that there may be multiple primitive polynomials of any given order N−1. This means that for a LFSR 20 having a given number of bits N, there may be multiple possible different combinations of inputs that may be provided to the P exclusive OR circuits.

Figure 4:
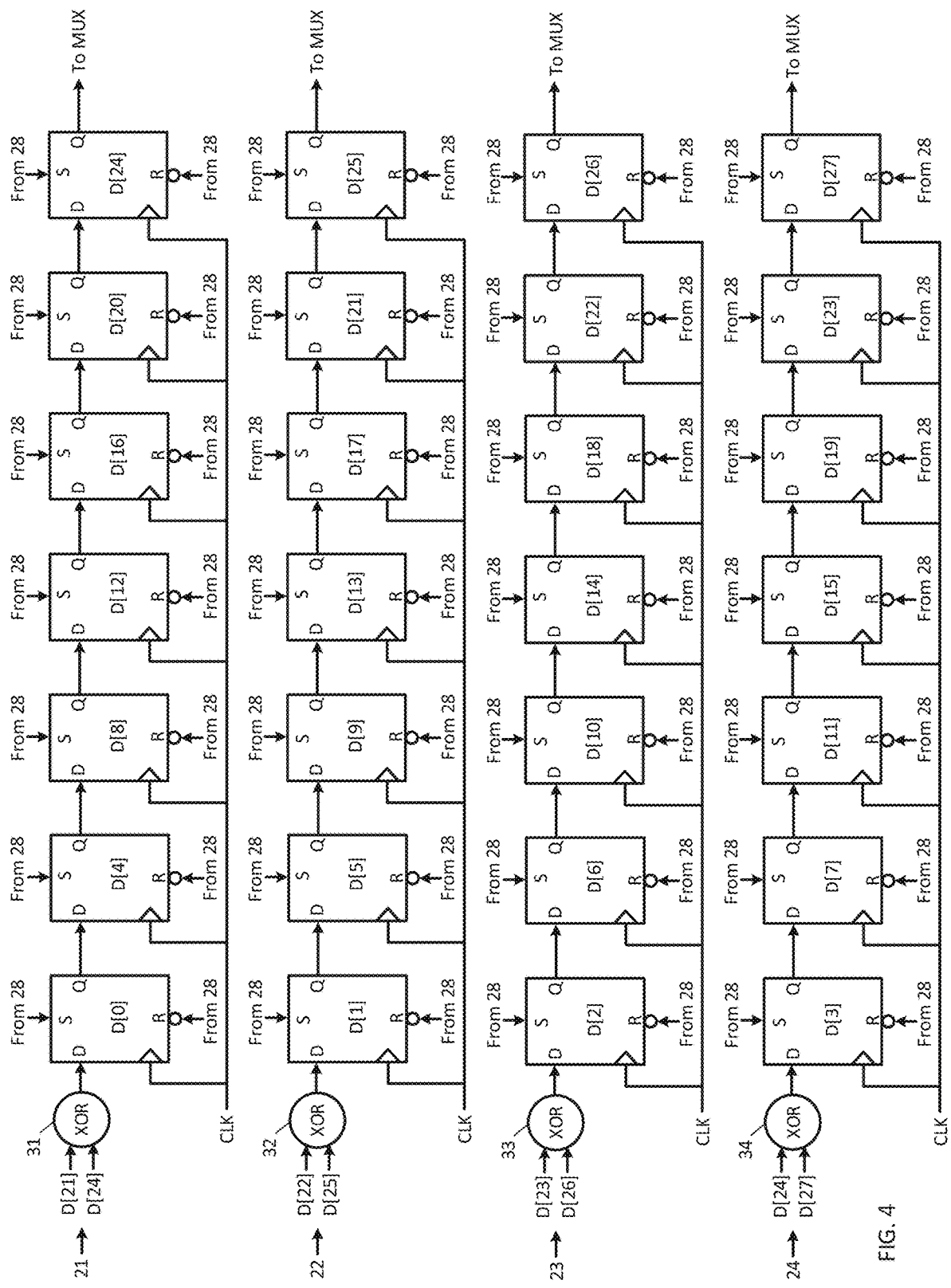
FIG. 4 is a schematic block diagram illustrating a specific example of the parallel logic blocks of FIG. 2.

One example is shown in FIG. 4. Here, N=25 and P=4. Therefore: the first parallel logic block 21 has the flip flops D[0], D[4], D[8], D[12], D[16], D[20], and D[24]; the second parallel logic block 22 has the flip flops D[1], D[5], D[9], D[13], D[17], D[21], and D[25]; the third parallel logic block 23 has the flip flops D[2], D[6], D[10], D[14], D[18], D[22], and D[26]; and the fourth parallel logic block 24 has the flip flops D[3], D[7], D[11], D[15], D[19], D[23], and D[27]. The primitive polynomial of order 24 used here has exponents of 24 and 21. Therefore: the inputs to the exclusive OR circuit 31 are the outputs of D[21] and D[24]; the inputs to the exclusive OR circuit 32 are the outputs of D[22] and D[25]; the inputs to the exclusive OR circuit 33 are the outputs of D[23] and D[26]; and the inputs to the exclusive OR circuit 34 are the outputs of D[24] and D[27].

Start states for the LFSR 20 will now be described. At the start of operation, the controller 28 may reset each flip flop of each parallel logic block by asserting the reset signal (which may be a logic low signal) to those flip flops, with the exception of one flip flop of each parallel logic block which the controller 28 sets. Which flip flop of each parallel logic block is set may change from iteration to iteration, with the setting of different flip flops resulting in different LFSR output words. In some instances, at the start of operation, the controller 28 may reset each flip flop of each parallel logic block by asserting the reset signal to those flip flops, with the exception of two or more flip flops of each parallel logic block which the controller sets 28. Which flip flops of each parallel logic block are set may change from iteration to iteration, with the setting of different flip flops resulting in different LFSR output words.

Figure 5:
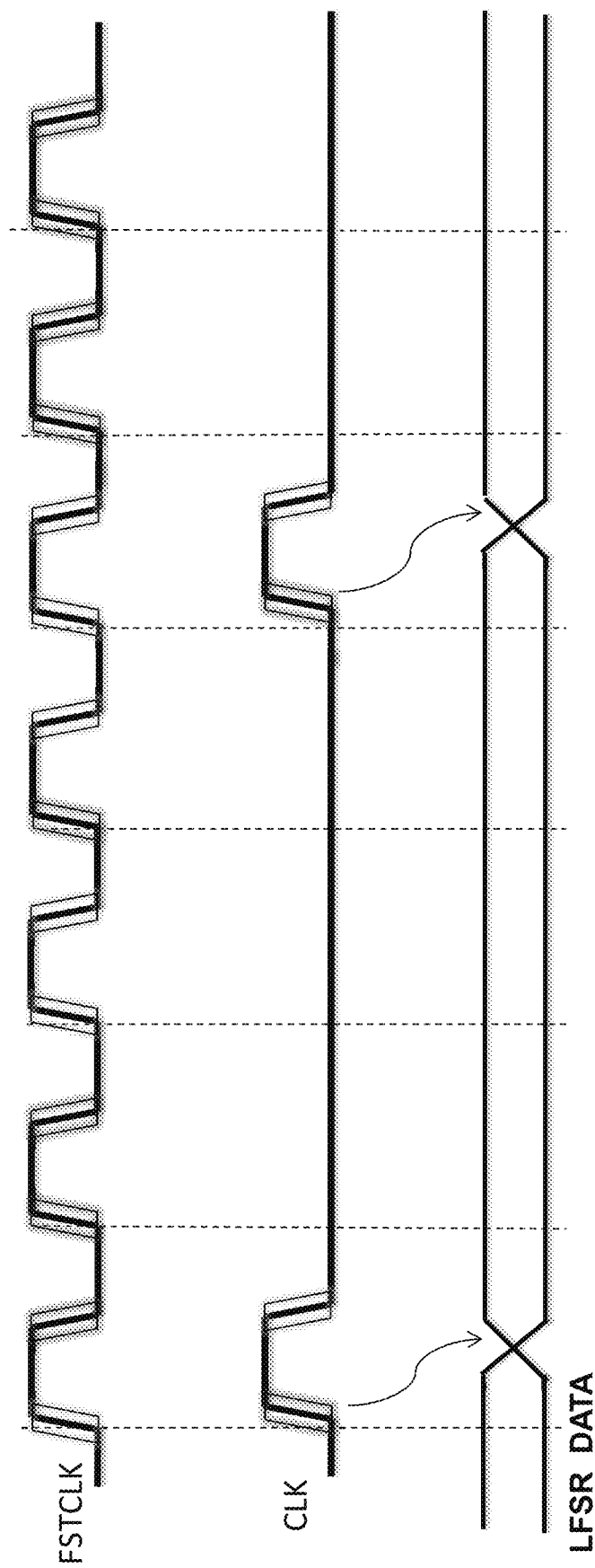
FIG. 5 is a graph showing the relation between the high speed clock FSTCLK and the low speed clock CLK.

As stated, the slow clock CLK is a version of the high speed clock FSTCLK divided by P. This can be seen in FIG. 5 where P=4, where it can also be observed that completion of output of an N-bit LFSR output word occurs at each rising edge of the slow CLK (as different sub-words of the LFSR output word are output at each rising edge of the high speed clock FSTCLK).

Figure 1:
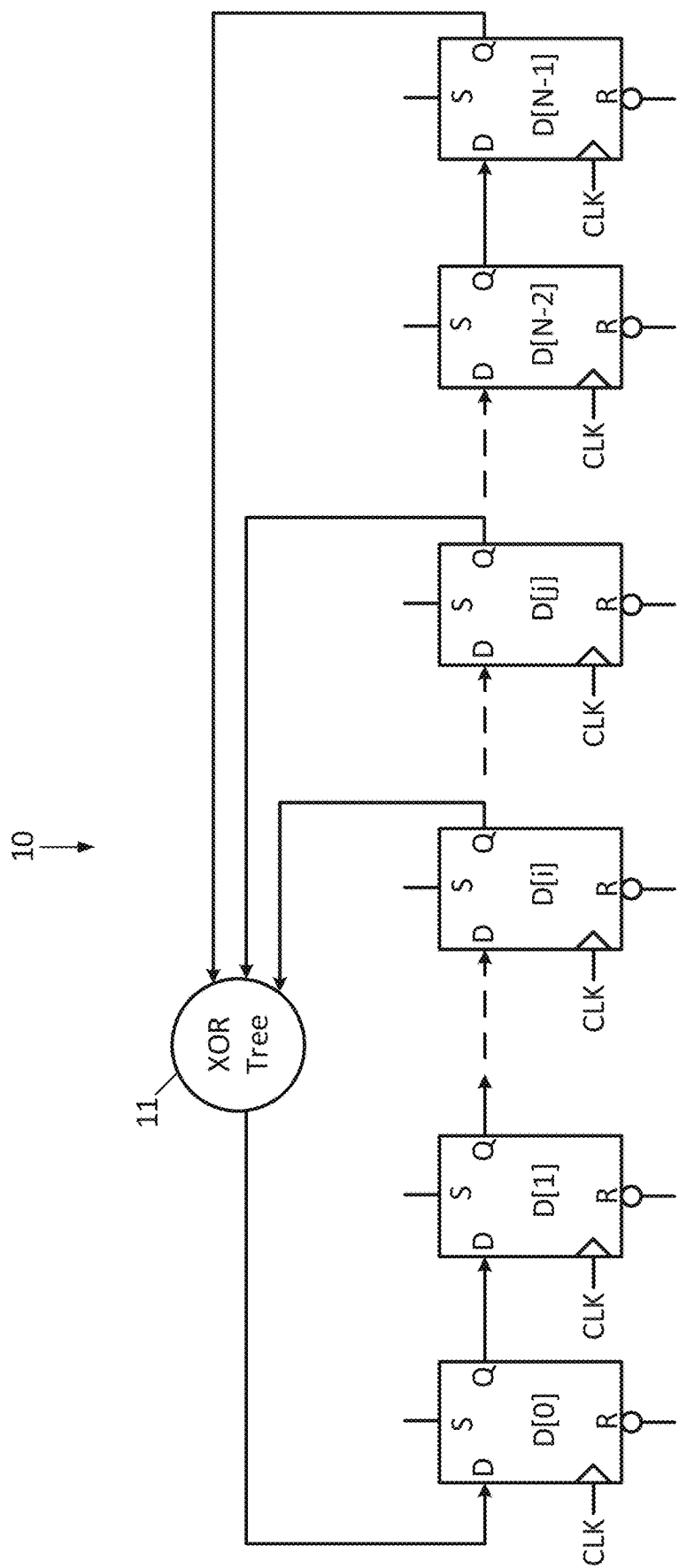
FIG. 1 is a block diagram of a prior art linear feedback shift register (LFSR).
Figure 6:
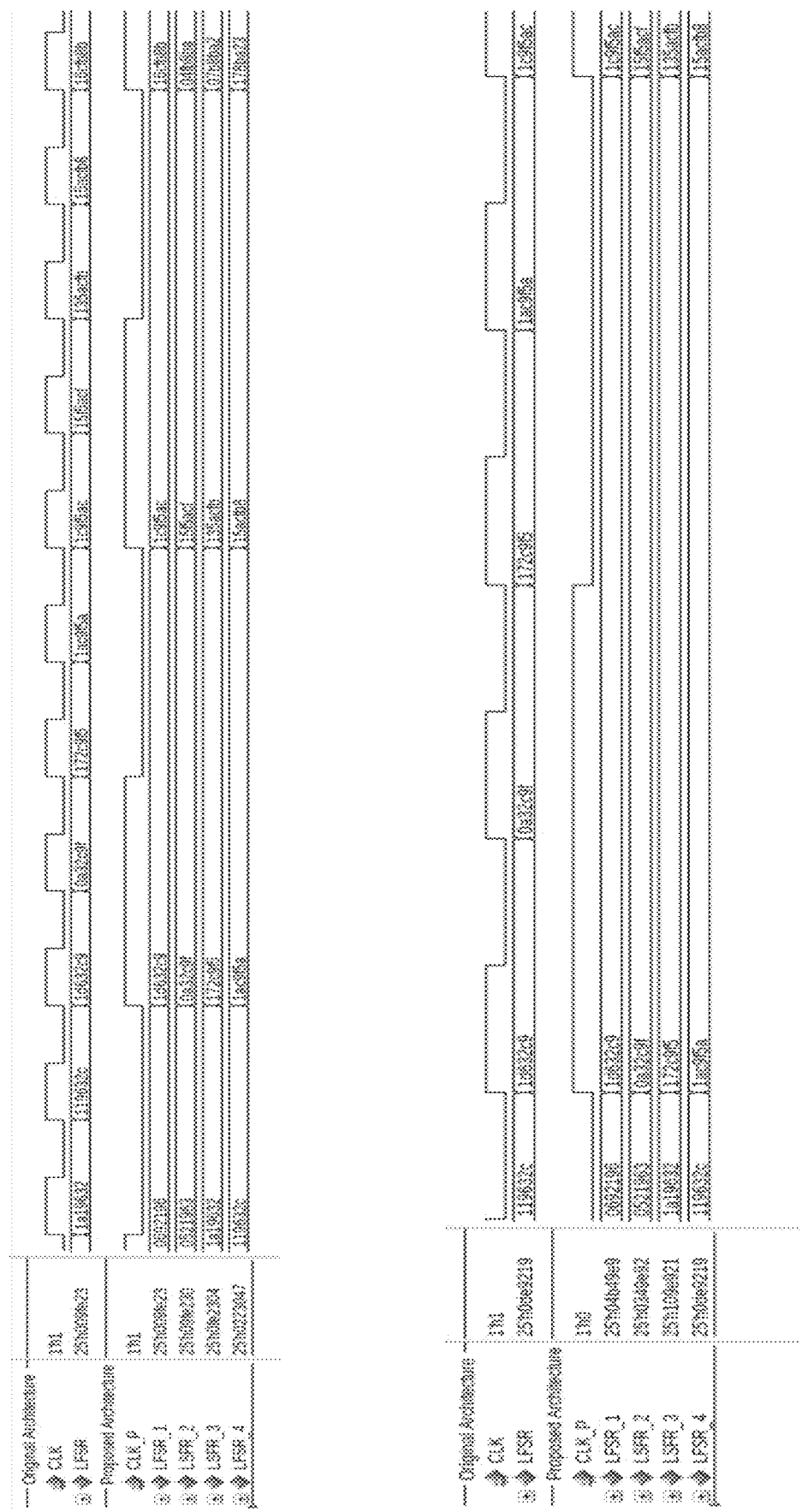
FIG. 6 is a graph comparing the output of the LFSR of FIG. 2 to the LFSR of FIG. 1, given the same input conditions.

Sample outputs showing that the N-bit LFSR output words produced by the LFSR 20 of FIG. 2 are the same as the N-bit LDSR output words produced by the LFSR 10 of FIG. 1, given the same input states to the parallel logic blocks, may be seen in FIG. 6. Observe, in the top graph, how when the LFSR output values are produced using the high speed clock FSTCLK to operate the flip flops (embodiment of FIG. 1), the first four LFSR output values produced are 105D7C4, 01D7C49, 1D7C490, and 0BC490F; now, observe directly below it that those very same values are produced when operating the flip flops (embodiment of FIG. 2) using the low speed clock CLK. The difference is that with the embodiment of FIG. 1, a LFSR output value is produced at each rising edge of the high speed clock FSTCLK, while with the embodiment of FIG. 2, four LFSR output values are produced in parallel at each rising edge of the low speed clock CLK. Thus, the embodiment of FIG. 2 could be considered to have the same throughput as the embodiment of FIG. 1, except for the fact that the embodiment of FIG. 2 can be run with the high speed clock FSTCLK at a higher frequency than is possible for the embodiment of FIG. 1 without the embodiment of FIG. 1 operating erroneously. Thus, the LFSR 20 of FIG. 2 is actually capable of higher throughput than the LFSR 10 of FIG. 1.

Figure 7A:
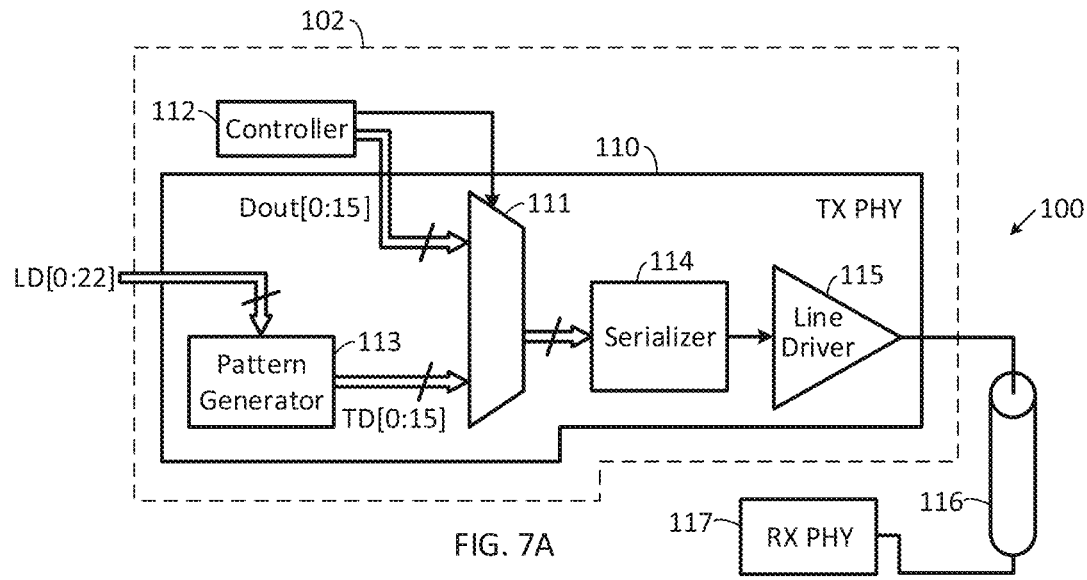
FIG. 7A is a block diagram of a serial data transmission system including transmission circuitry, as described herein.

Now described with reference to FIG. 7A is a serial data transmission system 100 including transmission side circuitry 102 (e.g., including a TX PHY layer 110), a physical link 116 over which data is transmitted in a serial fashion, and receiver side circuitry 117 (e.g., including a RX PHY layer) which receives the data transmitted over the physical link 116.

The transmission side circuitry 102 includes a controller 112 and the transmission physical layer (TX PHY) 110. The controller 112 outputs 16-bit data output words Dout[0:15] that are transmitted over the physical link 116 when the system 100 is operating in normal mode and not test node.

The TX PHY 110 includes a pattern generator 113 that receives a seed, labeled as load data LD[0:22], and generates a pseudo-random binary sequence (PRBS) from the seed LD[0:22].

As will be understood by those of skill in the art, a pseudo-random binary sequence (PRBS) is a binary sequence that is generated with a deterministic algorithm but exhibits statistical behavior similar to a truly random sequence, and is therefore useful in testing communication links. A PRBS may be generated using a monic polynomial as implemented by the pattern generator 113. Sample PRBS generating monic polynomials may be:

$PRBS7 = x^7 + x^6 + 1$ $PRBS9 = x^9 + x^5 + 1$ $PRBS11 = x^{11} + x^9 + 1$ $PRBS15 = x^{15} + x^{14} + 1$ $PRBS23 = x^{23} + x^{18} + 1$

The name of each PRBS pattern (e.g., PRBS7, PRBS9, etc) comes from the order of the monic polynomial representing that PRBS pattern, with the order of the monic polynomial indicating the size of the unique words in the PRBS pattern (e.g., 23-bit unique words in the PRBS23 pattern). The order of such monic polynomials will be an odd number.

The output test data TD[0:15] of the pattern generator 113 is a sequence of 16-bit words collectively conveying the intermediate words (described below) of the PRBS23 sequence. Since a PRBS sequence is deterministic, by transmitting a given PRBS sequence from the transmission side circuitry 102 to the receiver side circuitry 117 over the physical link 116, and then determining whether the received PRBS is as expected, whether the serial data transmission is functioning properly can be determined, and if it is determined that the serial data transmission is not functioning properly (in the case where the PRBS is not as expected), the receiver side circuitry 117 can set an error flag to be read by an external component. In addition, from the received PRBS, electrical parameters of the physical link 116 such as transition time and jitter performance can be determined, and the receiver side circuitry 117 can set an error flag or other flag if the electrical parameters are not as expected or not acceptable.

A multiplexer 111 receives the output of the controller 112 and the data output words Dout[0:15] generated by the pattern generator 113. The multiplexer 111 is controlled by the controller 112 to select the data output words Dout[0:15] for transmission during normal mode and to select the pattern generator 113 output TD[0:15] when operating in test mode. 16-bit words are output by the multiplexer 111 as input to a serializer 114, which serializes the 16-bit words for transmission as a bitstream by the line driver 115 over the physical link 116. Notice that the number of inputs to the serializer is even, while the size of the unique words in the PRBS pattern is odd (e.g., 16 inputs to the serializer 114 with a PRBS23 pattern).

Figure 7B:
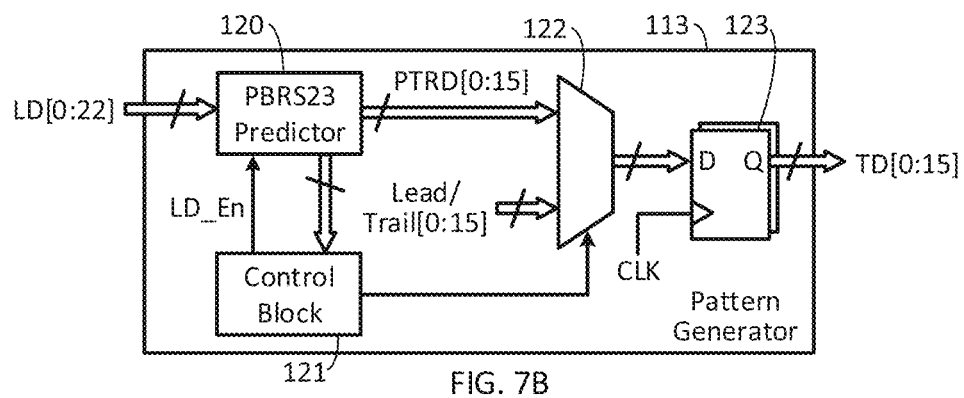
FIG. 7B is a block diagram of the pattern generator of the transmission circuitry of FIG. 7A.

The pattern generator 113 is now described with additional reference to FIG. 7B. The pattern generator 113 includes a PRBS predictor 120, such as a LFSR described above. The PRBS predictor 120 receives the seed LD[0:22], is enabled by an enable signal LD_En generated by a control block 121, and outputs each 16-bit intermediate word of the PRBS (intermediate words being described below) as pseudo-random test data PRTD[0:15].

A multiplexer 122 receives PRTD[0:15] as well as the leading or trailing word Lead/Trail[0:15] of the PRBS sequence (described below and read from a memory or generated by a suitable circuit) as input and provides its output to output flip flops 123 which output TD[0:15]. The control block 121 receives PRTD[0:15] as input, and from it controls the selection of the multiplexer 122.

The operation of the control block 121 and multiplexer 122 and the use of the leading or trailing word Lead/Trail [0:15] is now described. The maximum number of bits in a given PRBS sequence can be calculated as:

$$N = 2^k - 1$$

where k is the size of the unique words within the sequence. In the sample embodiment of the serial data transmission system 100 disclosed herein, a value of k=23 (corresponding to the PRBS23 sequence) is used, but the principles herein are equally applicable to other suitable PRBS sequences. Given a value of k=23, the maximum length N of the PRBS23 sequence is therefore $N = 2^k - 1 = 2^{23} - 1 = 8{,}388{,}607$ bits.

As is evident, 8,388,607 is not evenly disable by 16. The largest integer that 8,388,607 is evenly divisible by is 524,287. Multiplying 524,287 by 16 yields 8,388,592. Subtracting 8,388,592 from 8,388,607 yields 15. To fully represent the PRBS pattern generated, while permitting the pattern generator 113 to be usable with a variety of PRBS patterns, the remainder bits (here, 15-bits) may be split between a leading and trailing word of the PRBS pattern. Therefore, the PRBS23 pattern may be represented by a leading 16-bit word+524,287 intermediate 16-bit words+a trailing 16-bit word. The 16-bit leading word is comprised of 9 zeros as its most significant bits (MSBs) and the first 7-bits of the PRBS23 pattern as its least significant bits (LSBs), and the 16-bit trailing word is comprised of the last 8-bits of the PRBS23 pattern as its MSBs and 8 zeroes as its LSBs.

The control block 121 is configured to detect the initial and final state of the PRBS23 pattern, and as a consequence, based upon PTRD[0:15], causes the multiplexer 122 to accordingly first select the leading word for passage as output, then the 524,287 16-bit PTRD words for passage as output, and then the trailing word for passage as output.

Figure 7C:
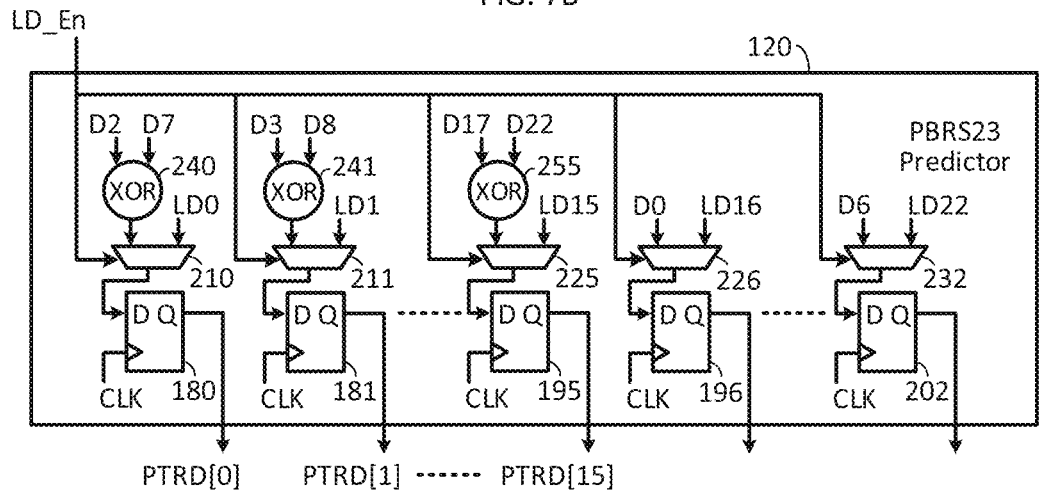
FIG. 7C is a block diagram of the pseudo-random binary sequence predictor of FIG. 7B.

A sample PRBS predictor 120 for generating a PRBS23 pattern is now described with additional reference to FIG. 7C. The PRBS predictor 120 generates the intermediate words of the PRBS pattern, based upon the seed as a starting word. Therefore, in the example of a PRBS23 pattern, the PRBS predictor 120 generates the 524,287 16-bit PTRD words (the 524,287 intermediate 16-bit PRBS23 words) based upon the seed.

The predictor 120 includes flip flops 180-202. Flip flops 180-195 serve to output the sixteen LSBs of the PRBS23 pattern as PRTD[0:15]. Multiplexers 210-232 respectively provide input to the D inputs of the LSB flip flops 180-202 and are controlled by the enable signal LD_En from the control block 121.

The multiplexers 210-232 each have two inputs respectively receiving the 16 LSBs of the seed LD[0:22] as their first inputs—multiplexer 210 receives the bit LD0 as a first input, multiplexer 211 receives the bit LD1 as a first input, and so on until multiplexer 232 receives the bit LD22 as a first input.

The second inputs of the multiplexers 210-225 respectively receive the outputs of exclusive-OR gates 240-255. XOR gate 240 has its inputs coupled to the D-inputs D2, D7 of the third and eighth flip flops 182, 187, XOR gate 241 has its inputs coupled to the D-inputs D3, D8 of the fourth and ninth flip flops 183, 188, and iteratively so on until XOR gate 255 has its inputs coupled to the D-inputs D17 and D22 of the eighteenth and twenty third flip flops 196, 201.

The second inputs of the multiplexers 226-232 are respectively coupled to the D-inputs of the first through seventh flip flops 180-186. For example, the multiplexer 226 has its second input coupled to the D-input D0 of the first flop flop 180, the multiplexer 227 has its second input coupled to the D-input D1 of the second flip flop 181, and iteratively so on until the multiplexer 232 has its second input coupled to the D-input D6 of the seventh flip flop 186.

In operation, the multiplexers 210-232 are controlled by the control block 121 such that that the seed is passed to the flip flops 180-202 at the first clock cycle by selecting the first inputs of the multiplexers 210-232 for passage as output, and thereafter the second inputs of the multiplexers 210-232 are selected for passage as output.

Although the above has been described with reference to a PRBS23 sequence being utilized, the pattern generator 113 is usable with any PRBS sequence. Indeed, by performing an integer divide between the total number of bits in the PRBS sequence and the bit-width of the serializer, the number of intermediate k-bit words can be determined, and by performing a modulo divide between the total number of bits in the PRBS sequence and the result of the integer divide, the total number of remainder bits to be communicated between the leading and trailing word can be determined. Thus, the pattern generator 113, can be utilized to match any PRBS pattern to any bit-width serializer, improving the device into which the transmission side circuitry 102 is incorporated by eliminating the requirement for a large area consuming first-in-first-out (FIFO) buffer or an elastic buffer, and permitting the device to be smaller than it would otherwise be.

Figure 8:
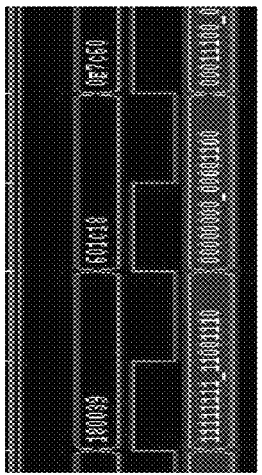
FIG. 8 is a waveform showing the output of the transmission circuitry of FIG. 7A during operation.
Figure 8:
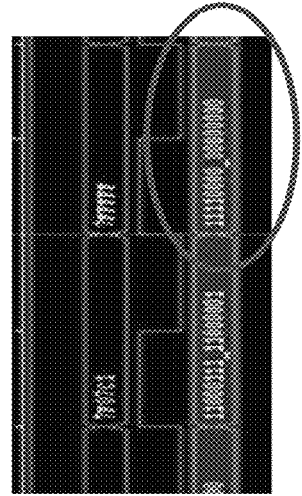
Figure 8:
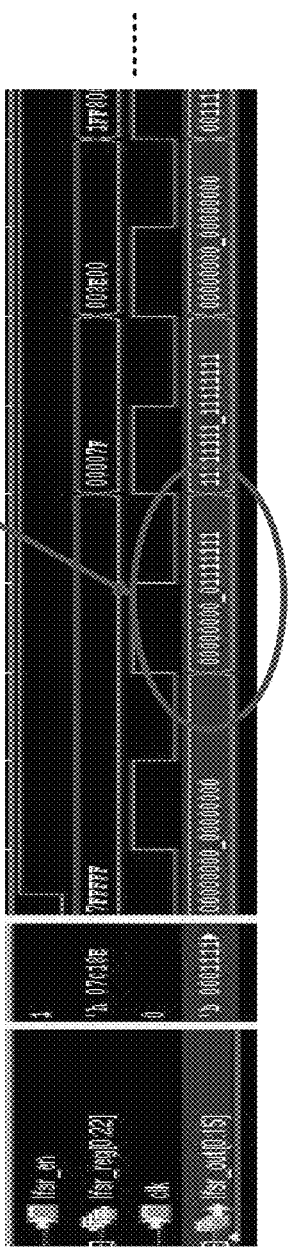
Figure 8:
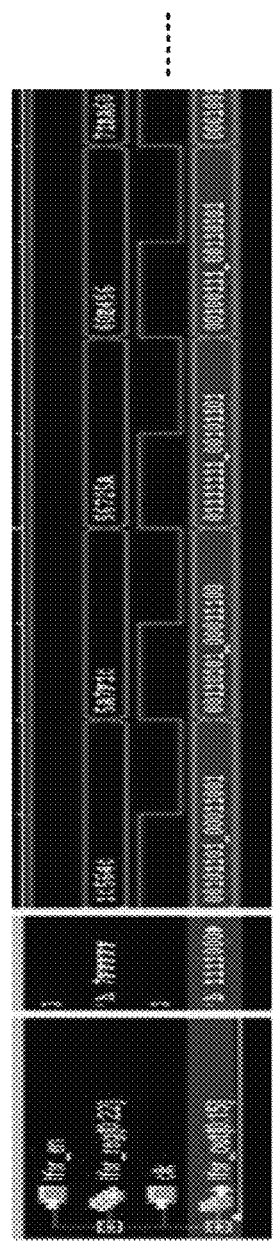

Sample results may be seen in FIG. 8 for a PRBS23 pattern, where the lead word as described with 9 zeroes as its MSBs and the first 7 PRBS bits as its LSBs, and the trailing word as described with 8 PRBS bits as its MSBs and 8 zeroes as its LSBs may be observed. Note that the 7 leading PRBS bits and 8 trailing PRBS bits are present due to the nature of the PRBS23 pattern, but for other PRBS patterns, there may be different numbers of leading and trailing PRBS bits.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method of testing a serial data connection, the method comprising:
    transmitting a pseudo-random binary sequence (PRBS) generated using a kth order monic polynomial from transmission side circuitry to reception side circuitry over a physical link; and
    determining whether the PRBS received at the reception side circuitry is as expected and/or determining electrical parameters of the physical link based on the PRBS received at the reception side circuitry, and indicating an error if the PRBS received at the reception side circuitry is not as expected or if the determined electrical parameters of the physical link demonstrate an error condition;
    wherein the PRBS is generated by:
        generating x intermediate words of the PRBS, with x being a result of an integer divide between a total number of bits in the PRBS and a bit-width of a serializer that transmits the PRBS over the serial data connection;
        generating a leading word of the PRBS, the leading word having first y bits of the PRBS as its least significant bits, with y being based upon a modulo divide between the total number of bits in the PRBS and x; and
        generating a trailing word of the PRBS, the trailing word having last z bits of the PRBS as its most significant bits, with z being based upon a difference between a result of the modulo divide and y; and
    wherein the PRBS is transmitted by performing steps of transmitting the leading word of the PRBS, transmitting the x intermediate words of the PRBS, and transmitting the trailing word of the PRBS.

2. The method of claim 1, wherein the leading word of the PRBS is generated as having its most significant bits as being zeroes.

3. The method of claim 1, wherein the trailing word of the PRBS is generated as having its least significant bits as being zeroes.

4. The method of claim 1, wherein the x intermediate words of the PRBS are generated using a hardware PRBS predictor that predicts the x intermediate words based upon a seed and outputs each intermediate word in a parallel fashion.

5. The method of claim 4, wherein transmitting the leading word of the PRBS comprises selecting the leading word for serialization and transmission; wherein transmitting the x intermediate words of the PRBS comprises selecting the x intermediate words of the PRBS for serialization and transmission; and wherein transmitting the trailing word of the PRBS comprises selecting the trailing word for serialization and transmission.

6. The method of claim 5, wherein the leading word of the PRBS is generated by reading from a memory element separate from the hardware PRBS predictor; and wherein the trailing word of the PRBS is generated by reading from the memory element.

7. The method of claim 5, wherein the kth order monic polynomial comprises a $23^{rd}$ order monic polynomial; and wherein the bit-width of the serializer is 16 bits.

8. The method of claim 1, wherein the kth order monic polynomial comprises a $23^{rd}$ order monic polynomial; and wherein the bit-width of the serializer is 16 bits.

9. The method of claim 1, wherein the kth order monic polynomial comprises a monic polynomial that is odd in order; and wherein the bit-width of the serializer is even.

10. Transmission-side circuitry for use in a serial communications system, the transmission-side circuitry comprising:
   a pattern generator configured to generate a pseudo-random binary sequence (PRBS) according to a kth order monic polynomial, the PRBS being generated as a series of words of a given bit size;
   a serializer having a number of inputs equal in number to the given bit size, coupled to serially receive the series of words of the PRBS from the pattern generator, and producing a PRBS output; and
   a line driver configured to transmit the PRBS output in a serial fashion over a physical link;
   wherein the pattern generator comprises:
      a PRBS predictor configured to generate x intermediate words of the PRBS based upon a received k-bit seed and output the x intermediate words in a parallel fashion, with x being a result of an integer divide between a total number of bits in the PRBS and the given bit size;
      a multiplexer having: a first input set coupled to the PRBS predictor to receive the x intermediate words in a parallel fashion, and a second input set coupled to receive either a leading word or a trailing word in a parallel fashion;
      wherein the leading word has first y bits of the PRBS as its least significant bits, with y being based upon a modulo divide between the total number of bits in the PRBS and x;
      wherein the trailing word of the PRBS has last z bits of the PRBS as its most significant bits, with z being based upon a difference between a result of the modulo divide and y; and
      a control circuit configured to receive the x intermediate words of the PRBS and based thereupon, control the multiplexer to sequentially output the leading word of the PRBS, output the x intermediate words of the PRBS, and output the trailing word of the PRBS.

11. The transmission-side circuitry of claim 10, further comprising a memory element configured to store the leading word of the PRBS and the trailing word of the PRBS.

12. The transmission-side circuitry of claim 10, wherein the kth order monic polynomial comprises a monic polynomial that is odd in order; and wherein the serializer has an even number of inputs.

13. The transmission-side circuitry of claim 10, wherein the kth order monic polynomial comprises a $23^{rd}$ order monic polynomial; and wherein given bit size is 16 bits.

14. The transmission-side circuitry of claim 13, wherein the PRBS predictor comprises:
   23 flip flops clocked by a same clock signal and providing outputs in parallel to the multiplexer; and
   16 multiplexers having outputs respectively coupled to inputs of 16 of the 23 flip flops, having first inputs respectively receiving k-bits of the k-bit seed, and having second inputs respectively receiving outputs of 16 exclusive-OR gates; wherein each of the 16 exclusive-OR gates has inputs coupled to different ones of the outputs of the 23 flip flops.

15. The transmission-side circuitry of claim 10, wherein the leading word of the PRBS has its most significant bits as being zeroes.

16. The transmission-side circuitry of claim 10, wherein the trailing word of the PRBS has its least significant bits as being zeroes.

* * * * *